(12) United States Patent
Zhou et al.

(10) Patent No.: US 9,323,822 B2
(45) Date of Patent: Apr. 26, 2016

(54) DATA BACKUP METHOD AND DEVICE FOR MOBILE TERMINAL

(75) Inventors: Baozhong Zhou, Guangdong (CN); Yu Zheng, Guangdong (CN); Yang Ding, Guangdong (CN)

(73) Assignee: HUIZHOU TCL MOBILE COMMUNICATION CO., LTD, Huizhou, Guangdong (CN)

( * ) Notice: Subject to any disclaimer, the term of this patent is extended or adjusted under 35 U.S.C. 154(b) by 723 days.

(21) Appl. No.: 13/637,349

(22) PCT Filed: Aug. 29, 2011

(86) PCT No.: PCT/CN2011/079067
§ 371 (c)(1),
(2), (4) Date: Sep. 25, 2012

(87) PCT Pub. No.: WO2012/028080
PCT Pub. Date: Mar. 8, 2012

(65) Prior Publication Data
US 2013/0018846 A1 Jan. 17, 2013

(30) Foreign Application Priority Data
Sep. 1, 2010 (CN) .......................... 2010 1 0278668

(51) Int. Cl.
*G06F 17/30* (2006.01)
(52) U.S. Cl.
CPC ............................... *G06F 17/30578* (2013.01)
(58) Field of Classification Search
CPC ............ G06F 11/1448; G06F 11/1469; G06F 17/30575; G06F 17/30914
USPC ......................................................... 707/647
See application file for complete search history.

(56) References Cited

U.S. PATENT DOCUMENTS

| | | | | |
|---|---|---|---|---|
| 7,844,445 | B2 * | 11/2010 | Brunet et al. .................... | 703/23 |
| 8,510,331 | B1 * | 8/2013 | Zoellner et al. ................ | 707/770 |
| 2004/0015408 | A1 * | 1/2004 | Rauen et al. ..................... | 705/26 |
| 2005/0050474 | A1 * | 3/2005 | Bells et al. ...................... | 715/747 |
| 2005/0165815 | A1 * | 7/2005 | Ozzie et al. .................... | 707/100 |
| 2007/0179926 | A1 * | 8/2007 | Chiang ............................. | 707/1 |
| 2007/0220032 | A1 * | 9/2007 | Kapoor et al. ................. | 707/102 |

(Continued)

FOREIGN PATENT DOCUMENTS

| | | |
|---|---|---|
| CN | 101022612 | 8/2007 |
| CN | 101394635 A | 3/2009 |

(Continued)

OTHER PUBLICATIONS

International Search Report mailed Dec. 8, 2011 for PCT/CN2011/079067.

*Primary Examiner* — Dinku Gebresenbet
(74) *Attorney, Agent, or Firm* — Hauptman Ham, LLP

(57) ABSTRACT

The present invention relates to a mobile terminal technology. The present invention discloses a data back method and device for a mobile terminal. Since the data backup method and device of the mobile terminal provided in the present invention encodes a data in the mobile terminal into UTF-8 and stores it in the xml file, it is quite convenient to back up the data in the mobile terminal to the xml file. It is also beneficial for a user to manage the data in the mobile terminal. The present invention provides convenience for the user, the operation is simple, and the backup is easy to be done.

16 Claims, 3 Drawing Sheets

(56) References Cited

U.S. PATENT DOCUMENTS

2007/0250645 A1* 10/2007 Meadows et al. ............ 709/248
2008/0034021 A1* 2/2008 De Spiegeleer ............... 707/204
2008/0125877 A1* 5/2008 Miller et al. ................ 707/104.1
2011/0249144 A1* 10/2011 Chang ........................ 348/231.3

FOREIGN PATENT DOCUMENTS

| | | |
|---|---|---|
| CN | 101707751 A | 5/2010 |
| CN | 101720140 | 6/2010 |
| JP | 2004-312317 | 11/2004 |

* cited by examiner

DATA BACKUP METHOD AND DEVICE FOR MOBILE TERMINAL

CROSS REFERENCE TO RELATED APPLICATION

This application claims the priority of Chinese Patent Application No. 201010278668.4, filed on Sep. 1, 2010 in the SIPO (State Intellectual Property Office of the P.R.C). Further, this application is the National Phase application of International Application No. PCT/CN2011/079067 filed Aug. 29, 2011, which designates the United States and was published in Chinese.

TECHNICAL FIELD OF THE INVENTION

The present invention relates to a mobile terminal technology, and more particularly, to a data backup method and device for a mobile terminal.

BACKGROUND OF THE INVENTION

Nowadays, the popularity of mobile communication device is higher and higher. As diverse communications are developed and personal communication demands are increased, the amount of personal data stored in the mobile communication terminal is larger and larger. Since the mobile terminal has limited storage capacity, screen size, and operational constraint, a user feels that it is hard to manage more and more address lists and short message data. At present, there does not have a great manage scheme to export the data in the mobile terminal among conventional skills.

Therefore, the conventional skills leave a great deal to be improved and enhanced.

SUMMARY OF THE INVENTION

As to the aforesaid disadvantages of the conventional skills, the technical problem to be solved in the present invention is to provide a data backup method and device for a mobile terminal such that it is quite convenient to export and back up the data in the mobile terminal, it is also beneficial for a user to manage the data, the operation is simple, and the backup is easy to be done.

In the present invention, the technical schemes adopted to solve the technical problems are listed as follows.

A data backup method for a mobile terminal comprises steps of:
A. checking whether an xml file name and its file path used to store a backup data are validated or not, going to Step F if not validated, or else, creating an xml file and going to Step B;
B. determining whether to export a phone book data or not; if yes, go to a phone book data backup process to copy the phone book data to the created xml file; if not, turn to Step C for entering a short message export determination;
C. determining whether to export a short message data or not; if yes, go to a short message data backup process to copy the short message data to the created xml file; if not, turn to Step D for entering a multimedia message export determination;
D. determining whether to export a multimedia message data or not; if not, go to Step F; if yes, go to a multimedia message data backup process to copy the multimedia message data to the created xml file;
E. determining whether all the data backup processes are accomplished or not; if not, go back to Step B for proceeding next determination; if yes, go to Step F;
F. terminating the whole process.

In the data backup method of the mobile terminal, the phone book data backup process in Step B comprises steps of:
B1. reading a phone book entry;
B2. encoding the phone book entry that has been read into UTF-8 and writing it to the created xml file;
B3. determining whether the phone book data backup process is accomplished or not; if not, go back to Step B1; if yes, go to Step E.

In the data backup method of the mobile terminal, the short message data backup process in Step C comprises steps of:
C1. reading a short message entry;
C2. encoding the short message entry that has been read into UTF-8 and writing it to the created xml file;
C3. determining whether the short message data backup process is accomplished or not; if not, go back to Step C1; if yes, go to Step E.

In the data backup method of the mobile terminal, the multimedia message data backup process in Step D comprises steps of:
D1. reading a multimedia message entry;
D2. encoding the multimedia message entry into UTF-8 and writing it to the created xml file;
D3. determining whether the multimedia message data backup process is accomplished or not; if not, go back to Step D1; if yes, go to Step E.

In the data backup method of the mobile terminal, UTF-8 is adopted to encode the created xml file.

In the data backup method of the mobile terminal, the phone book data comprises a last name data, a first name data, a cell phone number data, a home telephone number data, an office telephone number data, and/or an email address data.

In the data backup method of the mobile terminal, the short message data comprises a sender phone number data, a short message receiving time data, and/or a message content data.

In the data backup method of the mobile terminal, the multimedia message data comprises a sender phone number data, a multimedia message receiving time data, a text message content data, an image file path data, a video file path data, and/or an audio file path data.

A data backup device for a mobile terminal comprises:
an xml file checking module, for checking whether an xml file name and its file path used to store a backup data are validated or not;
an xml file creating module, for creating an xml file when the xml file name and its file path used to store the backup data are validated;
a phone book data backup module, for determining whether to export a phone book data or not; if yes, go to a phone book data backup process to copy the phone book data to the created xml file;
a short message backup module, for determining whether to export a short message data or not; if yes, go to a short message data backup process to copy the short message data to the created xml file;
a multimedia message backup module, for determining whether to export a multimedia message data or not; if yes, go to a multimedia message data backup process to copy the multimedia message data to the created xml file;
a backup checking module, for determining whether all the data backup processes are accomplished or not; if yes, terminate the whole process.

In the data backup device of the mobile terminal, the phone book data backup module comprises:
- a phone book data reading unit, for reading phone book entries one by one;
- a phone book data writing unit, for encoding the phone book entry that has been read into UTF-8 and writing it to the created xml file;
- a phone book data determining unit, for determining whether the phone book data backup process is accomplished or not.

In the data backup device of the mobile terminal, the short message data backup module comprises:
- a short message data reading unit, for reading short message entries one by one;
- a short message data writing unit, for encoding the short message entry that has been read into UTF-8 and writing it to the created xml file;
- a short message data determining unit, for determining whether the short message data backup process is accomplished or not.

In the data backup device of the mobile terminal, the multimedia message data backup module comprises:
- a multimedia message data reading unit, for reading multimedia message entries one by one;
- a multimedia message data writing unit, for encoding the multimedia message entry that has been read into UTF-8 and writing it to the created xml file;
- a multimedia message data determining unit, for determining whether the multimedia message data backup process is accomplished or not.

Since the data backup method and device of the mobile terminal provided in the present invention encodes a data in the mobile terminal into UTF-8 and stores it in the xml file, it is quite convenient to back up the data in the mobile terminal to the xml file. It is also beneficial for a user to manage the data in the mobile terminal. The present invention provides convenience for the user, the operation is simple, and the backup is easy to be done.

DETAILED DESCRIPTION OF THE INVENTION

The present invention provides a data backup method and device for a mobile terminal, which proceeds a backup mainly by encoding a data in a cell phone into UTF-8 and storing it in an xml file. When recovering the data, the data in the xml file is directly encoded into a code suitable for the mobile terminal and then store it into the mobile terminal.

To make the objectives, technical schemes, and advantages of the present invention more clear, the present invention will be described in detail as follows in conjunction with drawings and embodiments. It should be understood that the embodiments described herein are merely used for interpreting the present invention, but the present invention is not limited thereto.

Figure 1:
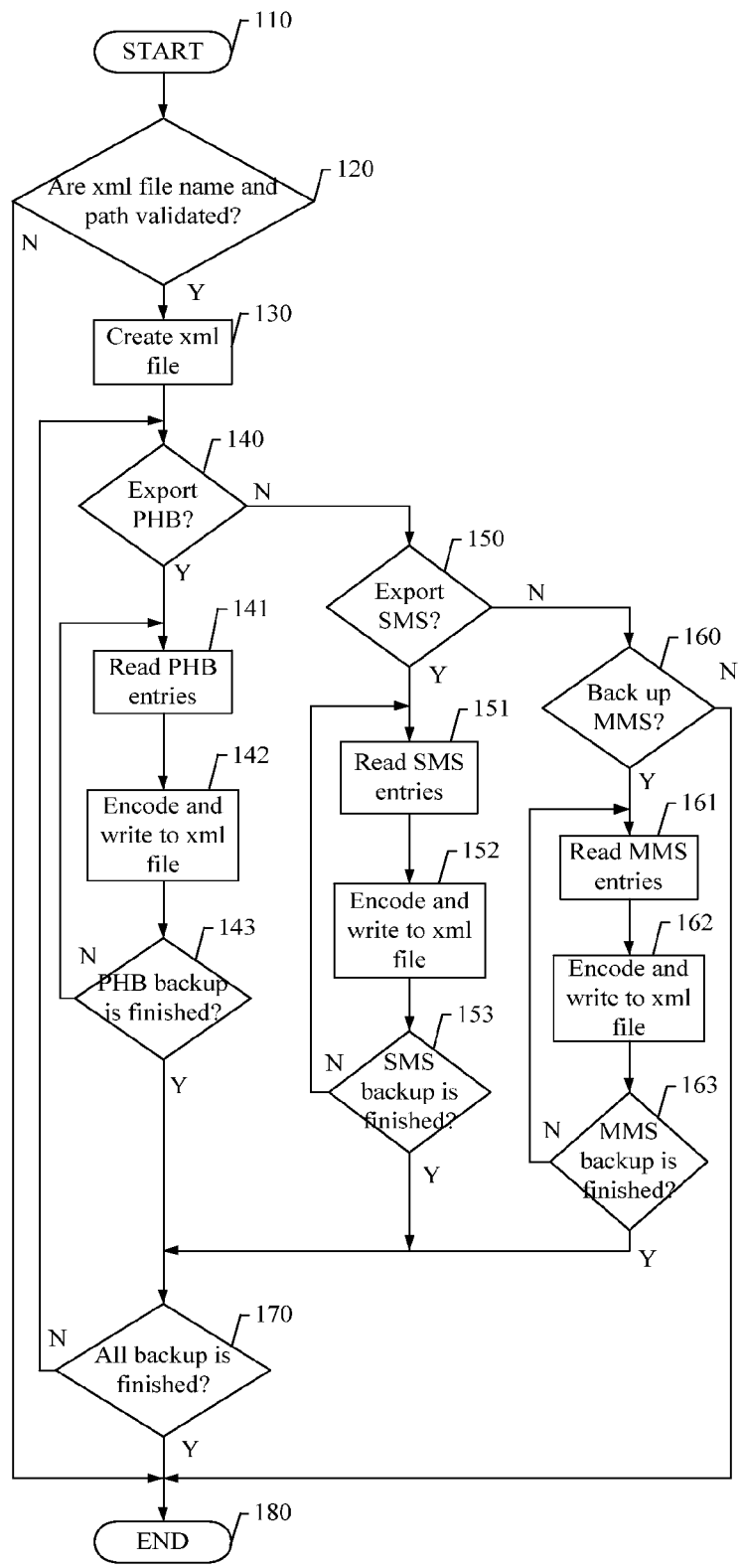
FIG. 1 is a flow chart of a data backup method for a mobile terminal according to an embodiment of the present invention.

As shown in FIG. 1, a data backup method for a mobile terminal according an embodiment of the present invention comprises following steps. Abbreviations shown in the steps are:

PHB: Phone Book,
SMS: Short Message Service,
MMS: Multimedia Message Service,
XML: Extensible Markup Language.

As shown in FIG. 1, said method comprises steps of:

Step S110: begin to export a backup data.

Step S120: check whether an xml file name and its file path used to store the backup data of the mobile terminal are validated or not. If not validated, go to Step S180 to terminate the process. Otherwise, go to Step S130.

Step S130: create an xml file for storing the backup data of the mobile terminal for proceeding a backup for the mobile terminal. Backup processes of the mobile terminal are described as follows.

Step S140: determine whether to export a PHB (phone book) data or not. If not, go to Step S150 for entering a SMS (short message service) data export determination. If yes, go to a PHB data backup process to copy the PHB data to the created xml file. The PHB data backup process comprises Steps S141, S142, and S143.

Step S141: read PHB entries one by one. For example, read one PHB entry first.

Step S142: encode the PHB entry that has been read into UTF-8 and write it to the xml file created in Step S130.

Step S143: determine whether the PHB data backup process is accomplished or not. If not, go back to Step S141 and repeat Steps S141, S142, and S143. If the PHB data backup process is accomplished, go to Step S170.

Step S150: determine whether to export a SMS data or not. If yes, go to a SMS data backup process to copy the SMS data to the created xml file. The SMS data back process comprises Steps S151, S152, and S153. If not, turn to Step S160 for entering a MMS (multimedia message service) data export determination.

Step S151: read SMS entries one by one. For example, read one SMS entry first.

Step S152: encode the SMS entry that has been read into UTF-8 and write it to the xml file created in Step S130.

Step S153: determine whether the SMS data backup process is accomplished or not. If not, go back to Step S151 and repeat Steps S151, S152, and S153. If the SMS data backup process is accomplished, go to Step S170.

Step S160: determine whether to back up a MMS data or not. If yes, go to a MMS data backup process to copy the MMS data to the created xml file. The MMS data back process comprises Steps S161, S162, and S163. If not, go to Step S180 to terminate the whole backup process.

Step S161: read MMS entries one by one. For example, read one MMS entry first.

Step S162: encode the MMS entry that has been read into UTF-8 and write it to the xml file created in Step S130.

Step S163: determine whether the MMS data backup process is accomplished or not. If not, go back to Step S161 and repeat Steps S161, S162, and S163. If the MMS data backup process is accomplished, go to Step S170.

Step S170: determine whether all the data backup processes are accomplished or not. If yes, go to Step S180 to terminal the whole process. If not, go back to Step S140 for proceeding next determination.

Step S180: terminate the whole process.

Figure 2:
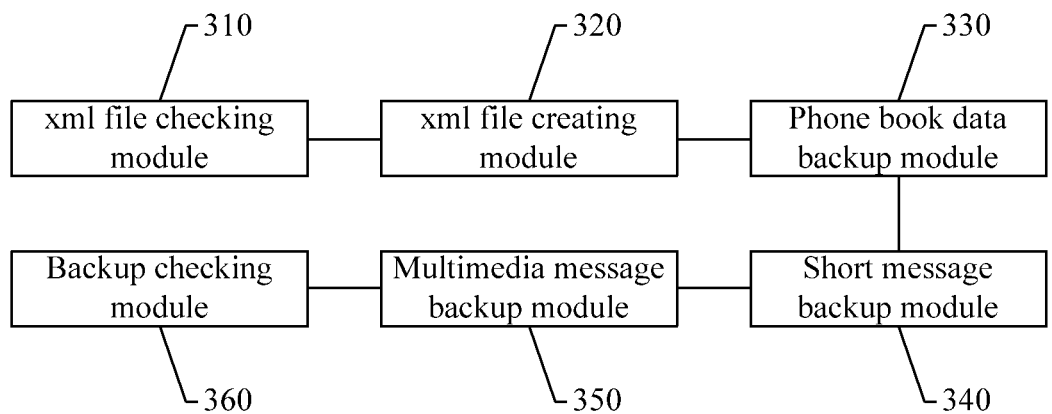
FIG. 2 is a schematic diagram showing a data backup device for a mobile terminal according to an embodiment of the present invention.

Based on the aforementioned data backup method for the mobile terminal, an embodiment of the present invention further provides a data backup device for the mobile terminal, as shown in FIG. 2. Said data backup device comprises:

An xml file checking module 310 is utilized for checking whether an xml file name and its file path used to store a backup data are validated or not.

An xml file creating module 320 is utilized for creating an xml file when the xml file name and its file path used to store the backup data are validated.

A phone book data backup module 330 is utilized for determining whether to export a PHB data or not. If yes, go to a PHB data backup process to copy the PHB data to the created xml file.

A short message backup module 340 is utilized for determining whether to export a SMS data or not. If yes, go to a SMS data backup process to copy the SMS data to the created xml file.

A multimedia message backup module 350 is utilized for determining whether to export a MMS data or not. If yes, go to a MMS data backup process to copy the MMS data to the created xml file.

A backup checking module 360 is utilized for determining whether all the data backup processes are accomplished. If yes, terminate the whole process.

Figure 3:
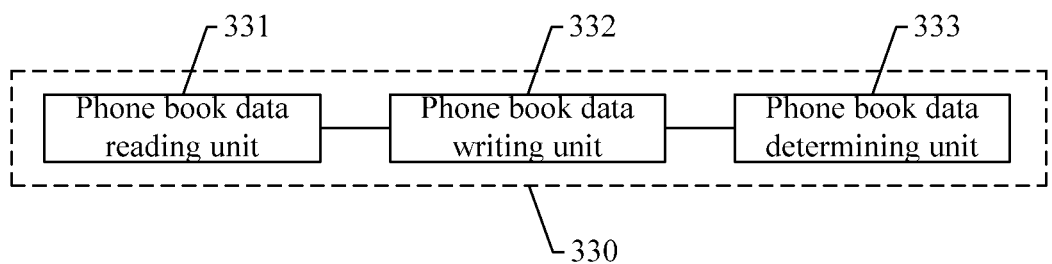
FIG. 3 is a schematic diagram showing a phone book data backup module according to an embodiment of the present invention.

In the data backup device of the mobile terminal, as shown in FIG. 3, the PHB data backup module 330 further comprises:

A phone book data reading unit 331 is utilized for reading PHB entries one by one.

A phone book data writing unit 332 is utilized for encoding the PHB entry that has been read into UTF-8 and writing it to the created xml file.

A phone book data determining unit 333 is utilized for determining whether the PHB backup process is accomplished.

Figure 4:
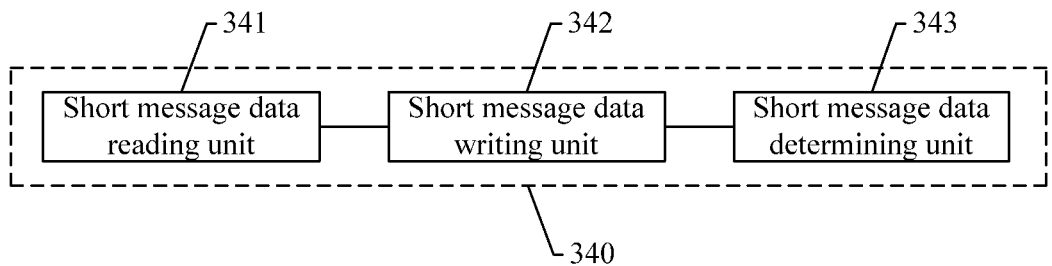
FIG. 4 is a schematic diagram showing a short message data backup module according to an embodiment of the present invention.

As shown in FIG. 4, the short message backup module 340 further comprises:

A short message data reading unit 341 is utilized for reading SMS entries one by one.

A short message data writing unit 342 is utilized for encoding the SMS entry that has been read into UTF-8 and writing it to the created xml file.

A short message data determining unit 343 is utilized for determining whether the SMS data backup process is accomplished.

Figure 5:
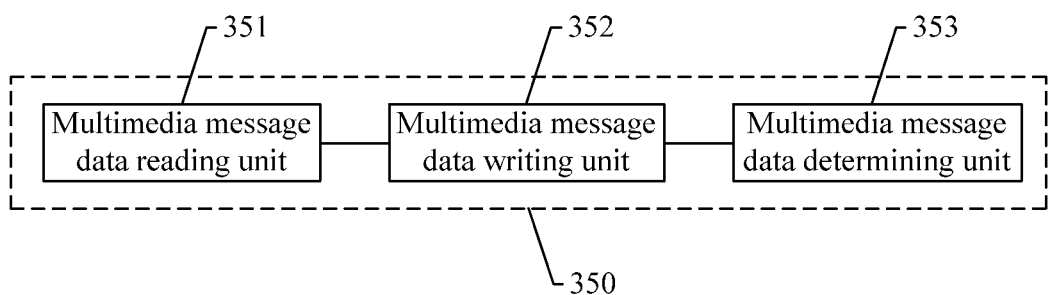
FIG. 5 is a schematic diagram showing a multimedia message data backup module according to an embodiment of the present invention.

As shown in FIG. 5, the multimedia message backup module 350 further comprises:

A multimedia message data reading unit 351 is utilized for reading MMS entries one by one.

A multimedia message data writing unit 352 is utilized for encoding the MMS entry that has been read into UTF-8 and writing it to the created xml file.

A multimedia message data determining unit 353 is utilized for determining whether the MMS data backup process is accomplished.

In the aforementioned data backup device of the mobile terminal, a format of the xml file is defined by adopting UTF-8, version 1.0, to encode the xml file, which comprises following elements.

1) A base element comprises several sub-elements such as PHB, SMS, and MMS elements.
2) A PHB element represents an entry in PHB. The PHB element comprises last name, first name, cell phone number, home telephone number, office telephone number, and email address data, and etc. That is, the PHB data comprises a last name data, a first name data, a cell phone number data, a home telephone number data, an office telephone number data, and/or an email address data.
3) A SMS element represents an entry in SMS. The SMS element comprises sender phone number, receiving time, and message content, and etc. That is, the SMS data comprises a sender phone number data, a SMS receiving time data, and/or a message content data.
4) A MMS element represents an entry in MMS. The MMS element comprises sender phone number, receiving time, text message content, image file path, video file path, and audio file path, and etc. That is, the MMS data comprises a sender phone number data, a MMS receiving time data, a text message content data, an image file path data, a video file path data, and/or an audio file path data.

When exporting and importing MMS according to the embodiment of the present invention, there may contain multimedia files such as images, video chips, and audio chips in MMS. These types of data cannot be written to the xml file and only can be stored in other manners. The xml file only store relative paths of these types of data.

In addition, with respect to encryption of backup files, the backup files need to be encrypted because of personal information safety concerns. However, the exporting and importing processes of the present invention do not relate to this part, and therefore this part will not be discussed herein. It may correspondingly add encryption and decryption processes to the exporting and importing processes of the present invention if necessary.

Above all, since the data backup method and device of the mobile terminal provided in the present invention encodes a data in the mobile terminal into UTF-8 and stores it in the xml file, it is quite convenient to back up the data in the mobile terminal to the xml file. It is also beneficial for a user to manage the data in the mobile terminal. The present invention provides convenience for the user, the operation is simple, and the backup is easy to be done.

It should be understood that a person skilled in the art can modify or alter according to the above descriptions. However, all modifications, alterations, and improvements should be within the scope of the appending claims of the present invention.

What is claimed is:

1. A data backup method for a mobile terminal, comprising steps of:
   A. checking whether an xml file name and its file path used to store a backup data are validated or not, going to Step F if not validated, or else, creating an xml file and going to Step B, the xml file being used to store the backup data for the mobile terminal, the backup data being classified into a plurality of classifications including a phone book data, a short message data, and a multimedia message data;
   B. determining whether to export the phone book data from the mobile terminal to the xml file or not,
      if yes, go to a phone book data backup process to read a phone book entry from the mobile terminal and write it to the created xml file as the phone book data, and
      if not, turn to Step C for entering a short message export determination;

C. determining whether to export the short message data from the mobile terminal to the xml file or not,
   if yes, go to a short message data backup process to read a short message entry from the mobile terminal and write it to the created xml file as the short message data, and
   if not, turn to Step D for entering a multimedia message export determination;
D. determining whether to export the multimedia message data from the mobile terminal to the xml file or not,
   if not, go to Step F, and
   if yes, go to a multimedia message data backup process to read a multimedia message entry from the mobile terminal and write it to the created xml file as the multimedia message data;
E. determining whether all the data backup processes are accomplished or not,
   if not, go back to Step B for proceeding next determination, and
   if yes, go to Step F; and
F. terminating the whole process.

2. The data backup method according to claim 1, wherein the phone book data backup process in Step B comprises steps of:
   B1. encoding the phone book entry that has been read into UTF-8 and writing it to the created xml file; and
   B2. determining whether the phone book data backup process is accomplished or not,
      if not, go back to Step B1, and
      if yes, go to Step E.

3. The data backup method according to claim 1, wherein the short message data backup process in Step C comprises steps of:
   C1. encoding the short message entry that has been read into UTF-8 and writing it to the created xml file; and
   C2. determining whether the short message data backup process is accomplished or not,
      if not, go back to Step C1, and
      if yes, go to Step E.

4. The data backup method according to claim 1, wherein the multimedia message data backup process in Step D comprises steps of:
   D1. encoding the multimedia message entry into UTF-8 and writing it to the created xml file; and
   D2. determining whether the multimedia message data backup process is accomplished or not,
      if not, go back to Step D1, and
      if yes, go to Step E.

5. The data backup method according to claim 1, wherein UTF-8 is adopted to encode the created xml file.

6. The data backup method according to claim 1, wherein the phone book data comprises one or more of a last name data, a first name data, a cell phone number data, a home telephone number data, an office telephone number data, and an email address data.

7. The data backup method according to claim 1, wherein the short message data comprises a sender phone number data, a short message receiving time data, and/or a message content data, and the multimedia message data comprises a sender phone number data, a multimedia message receiving time data, a text message content data, an image file path data, a video file path data, and/or an audio file path data.

8. A data backup device for a mobile terminal, comprising:
   an xml file checking module, for checking whether an xml file name and its file path used to store a backup data are validated or not;
   an xml file creating module, for creating an xml file when the xml file name and its file path used to store the backup data are validated, the xml file being used to store the backup data for the mobile terminal, the backup data being classified into a plurality of classifications including a phone book data, a short message data, and a multimedia message data;
   a phone book data backup module, for determining whether to export the phone book data from the mobile terminal to the xml file or not,
      if yes, go to a phone book data backup process to read a phone book entry from the mobile terminal and write it to the created xml file as the phone book data;
   a short message backup module, for determining whether to export the short message data from the mobile terminal to the xml file or not,
      if yes, go to a short message data backup process to read a short message entry from the mobile terminal and write it to the created xml file as the short message data;
   a multimedia message backup module, for determining whether to export the multimedia message data from the mobile terminal to the xml file or not,
      if yes, go to a multimedia message data backup process to read a multimedia message entry from the mobile terminal and write it to the created xml file as the multimedia message data; and
   a backup checking module, for determining whether all the data backup processes are accomplished or not,
      if yes, terminate the whole process.

9. The data backup device according to claim 8, wherein the phone book data backup module comprises:
   a phone book data reading unit, for reading the phone book entries one by one;
   a phone book data writing unit, for encoding the phone book entry that has been read into UTF-8 and writing it to the created xml file; and
   a phone book data determining unit, for determining whether the phone book data backup process is accomplished or not.

10. The data backup device according to claim 8, wherein
   the short message data backup module comprises:
      a short message data reading unit, for reading the short message entries one by one;
      a short message data writing unit, for encoding the short message entry that has been read into UTF-8 and writing it to the created xml file; and
      a short message data determining unit, for determining whether the short message data backup process is accomplished or not, and
   the multimedia message data backup module comprises:
      a multimedia message data reading unit, for reading the multimedia message entries one by one;
      a multimedia message data writing unit, for encoding the multimedia message entry that has been read into UTF-8 and writing it to the created xml file; and
      a multimedia message data determining unit, for determining whether the multimedia message data backup process is accomplished or not.

11. A data backup method for a mobile terminal, comprising steps of:
   creating an xml file, which is used to store backup data for the mobile terminal, the backup data being classified into a plurality of classifications including a phone book data, a short message data, and a multimedia message data;

encoding the xml file into a code suitable for the mobile terminal to store; and reading one of a phone book entry, a short message entry, and a multimedia message entry from the mobile terminal and write it to the created xml file as the phone book data, the short message data, or the multimedia message data.

12. The data backup method according to claim 11, further comprising checking whether all the classifications of the backup data have been completely exported from the mobile terminal to the created xml file.

13. The data backup method according to claim 11, wherein UTF-8 is adopted to encode the created xml file.

14. The data backup method according to claim 11, wherein each classification of the backup data comprises a plurality of entries, and the entries of the classification of the backup data are read one by one.

15. The data backup method according to claim 11, further comprising checking whether an file name and an file path of the xml file used to store the backup data are validated or not.

16. The data backup method according to claim 11, further comprising copying all the entries of the classification of the backup data to the created xml file.

* * * * *